United States Patent [19]

Chang et al.

[11] Patent Number: 4,874,629

[45] Date of Patent: Oct. 17, 1989

[54] PURIFICATION OF FISH OIL

[76] Inventors: Stephen S. Chang, 29 Gloucester Ct., East Brunswick, N.J. 08816; Yongde Bao, 267 George St., New Brunswick, N.J. 08901; Timothy J. Pelura, 3336 Solomon La., Alameda, Calif. 04501

[21] Appl. No.: 189,198

[22] Filed: May 2, 1988

[51] Int. Cl.[4] .......................... A23D 5/00; C11B 3/12

[52] U.S. Cl. .................................. 426/601; 260/428; 426/417; 426/487; 426/492

[58] Field of Search ............... 426/541, 601, 655, 486, 426/487, 488, 492, 330.6, 417; 260/428, 398, 420

[56] References Cited

U.S. PATENT DOCUMENTS

| | | | |
|---|---|---|---|
| 3,682,993 | 8/1972 | Wetzold | 260/428 X |
| 4,093,540 | 6/1978 | Sen Gupta | 426/417 X |
| 4,363,823 | 12/1982 | Kimura et al. | 426/417 X |
| 4,623,488 | 11/1986 | Takao | 260/428 X |

*Primary Examiner*—Donald E. Czaja
*Assistant Examiner*—Celine T. Callahan

[57] ABSTRACT

A process of treating oils containing Omega-3 fatty acids, such as fish oils like Menhaden oil, sardine oil, salmon oil and other oils, to produce odorless and flavorless oils which contain only insignificant amounts of undesirable minor constituents, such as thermal and oxidative polymers of unsaturated glycerides, trans-isomers, positional isomers, conjugated dienes and trienes, cholesterols, pesticides, PCBs and heavy metals, and which have reasonably good flavor and oxidative stabilities.

11 Claims, 2 Drawing Sheets

PURIFICATION OF FISH OIL

The present invention relates to a process of treating oils containing Omega-3 fatty acids, such as fish oils like Menhaden oil, sardine oil, salmon oil and other oils, to produce odorless and flavorless oils which contain only insignificant amounts of undesirable minor constituents, such as thermal and oxidative polymers of unsaturated glycerides, trans-isomers, positional isomers, conjugated dienes and trienes, cholesterols, pesticides, PCBs and heavy metals, and which have reasonably good flavor and oxidative stabilities. This invention also relates to a composition of matter, comprising the treated Omega-3 fatty acid containing oils in combination with certain antioxidants and/or combination with other oils, in order to produce a composition having improved stability. Antioxidants derived by the extraction of Rosemary have been found to be particularly effective.

BACKGROUND

Almost 30 years ago, polyunsaturated fatty acids (PUFAs) of vegetable origin (Omega-6) were found to have a hypocholesterolemic effect when substituted for saturated fat in the diet. In the early 1970's, Bang and Dyerberg observed a relative scarcity of coronary thrombosis among Greenland Eskimos which they were able to correlate to the diet of those Eskimos. The diet consisted of meat from Arctic mammals (seal and whale) as well as some fish. This provided them with a diet which included approximately 7 grams of Omega-3 fatty acids daily. These findings stimulated research into the impact of Omega-3 fatty acids on health in general. This led to the discovery that the Omega-3 series of fatty acids, and particularly eicosapentaenoic acid (hereinafter called EPA) (20:5 Omega-3) and docosahexaenoic acid (hereinafter called DHA) (22:6 Omega-3), have high pharmacological and dietary potential.

Recently, the potential advantages of the Omega-3 fatty acids derived from fish sources were reported in the New England Journal of Medicine, Volume 310, No. 19, pages 1205 through 1223, in papers by Kromhout et al., Phillipson et al. and Lee et al., May 9, 1985.

Fish oils containing EPA and DHA are manufactured by first mincing or cutting up the fish, cooking it for approximately 15 minutes at 90° C., and then separating the crude oil, which can then be alkaline refined and bleached. The oil so produced may be winterized or hydrogenated depending upon its final use. Finally, the oil may be deodorized by vacuum steam distillation at high temperatures, usually above 200° C.

Fish oils may be recovered from fish organs as well as from the meat of the fish. One such fish organ oil is cod liver oil, which has been used to improve health for decades, even though such oils are usually high in cholesterol, pesticides and heavy metals.

The fish oils processed as described above usually have a strong, highly objectionable fishy odor, plus a rancid odor and fishy flavor which are probably due to the autoxidation of polyunsaturated fatty acids and the deterioration of proteinaceous materials. In order to use the oil for edible and certain other purposes, it is necessary that the oil be deodorized.

Conventional deodorization processes involve the vacuum steam distillation of the oils at temperatures in excess of 200° C. While this process removes volatile flavor compounds, the high temperature to which the oils are subjected during the deodorization process creates undesirable side reactions, such as the formation of polymers, conjugated dienes, trans-isomers and other positional isomers. Most important of all, the content of EPA and DHA in the oil is decreased due to thermal decomposition as well as due to the formation of polymers. Moreover, the resulting product has poor flavor stability and poor resistance to oxidation. Although such undesirable side reactions are avoided if the products are distilled at low temperatures, e.g., 60°-100° C., such low temperature processes do not remove the higher boiling volatiles and more polar flavor compounds. Moreover, the low temperature vacuum steam distillation will not remove the undesirable minor constituents, such as cholesterols, pesticides, etc.

When Omega-3 fatty acid-containing oils, such as fish oil, are deodorized according to the prior art at high temperatures in excess of 200° C., certain chemical reactions will take place which would decrease the biological benefits of the oils. Moreover, the products of such chemical reactions may have adverse biological effects.

In the prestigious Tufts University Diet and Nutrition Letter (Vol. 5, No. 11, January 1988) it was reported that in analysis led by Dr. Ernest J. Schaefer, MD, Chief of the Lipid Metabolism Laboratory at the New England Medical Center, 10 major brands of fish oil capsules only contained an average of 38% of the EPA and 85% of the DHA that the companies claim are present. This is probably due to the loss of the biologically beneficial Omega-3 fatty acids with the formation of biologically harmful polymers during storage.

Another interesting observation is that during the deodorization according to prior art processs, at high temperatures, there is a tendency to form geometrical or positional isomers. The biological effects of these isomers to human health has been questioned in the literature.

The damages of prior art deodorization to fish oil are described quantitatively in detail in the Ph.D. dissertation submitted to Rutgers, The State University of New Jersey, in January, 1988, by Timothy J. Pelura. The title of the thesis is "The Effect of Deodorization Time and Temperature on the Chemical, Physical and Sensory Characteristics of Menhaden Oil".

ADVANTAGES OF THE PRESENT INVENTION

The process of the present invention overcomes the foregoing problems by combining a low temperature vacuum steam distillation of the oil with a treatment of the oil with silicic acid or other adsorbing compounds. The process of the present invention produces oils which are odorless and flavorless, containing insignificant amounts of undesirable thermally induced minor constituents such as polymers, conjugated dienes, trans-isomers and positional isomers. More importantly, the process of the present invention also removes such undesirable components which are originally present in the oil and are known to be harmful to health such as cholesterol, pesticides, PCBs and heavy metals, including lead. In addition the oils so produced have improved flavor and oxidative stabilities, particularly with the addition of suitable natural antioxidants.

In summary, the resulting oils produced by the process of the present invention have the following advantages:

1. no significant decrease in the content of EPA or DHA from the original oil;

2. no formation of thermal polymers, oxidative polymers or thermal-oxidative polymers;

3. essentially free from cholesterols (less than 1 mg per 1 g. of oil);
4. no significant increase of conjugated diene fatty esters;
5. no formation of trans-isomers or positional isomers of fatty esters;
6. free from pesticide residues and PCBs;
7. significantly reduced amount of heavy metals; and
8. improved flavor and oxidative stabilities as compared to fish oils which are normally deodorized at high temperatures of 200° C. or higher.

BRIEF DESCRIPTION OF THE PRESENT INVENTION

The present invention contemplates a 2-step process to purify oils containing EPA and DHA, particularly fish oils. One step involves vacuum steam distillation of the oils at low temperatures, for a short period of time. It has been found that the vacuum steam distillation is adapted to remove the low boiling and less polar volatile flavor compounds from the oil without creating polymers and other undesirable materials.

The other step of the process involves passing the low temperature deodorized oil through a silica gel column. The silica gel treatment is adapted to remove the high boiling and more polar volatile flavor compounds from the oil without creating polymers or other undesirable materials. In addition, the silica gel column also removes other undesirable materials which are originally present in the oil, such as polymers, cholesterol, pigments, pesticides, PCBs, and heavy metals.

Further it has been found that the oils produced by the process of the present invention have improved oxidative and flavor stabilities. Such stabilities can be further improved if antioxidants, particularly antioxidants derived from Rosemary, are added thereto. Still further, it has been found that oil compositions having increased and improved stability may be created by blending the fish oils treated by the process of the present invention with selected vegetable oils, particularly corn oil.

In another embodiment, the present invention contemplates the treatment of fish oils, which have been deodorized according to prior art processes at elevated temperatures. It has been found that such prior art oils can be significantly improved by passing them through the silica gel column, as described in the present invention. The damage done to the fish oil by the prior art high temperature process, can be partially eliminated, though not completely eliminated by this adsorbent treating. Moreover, it is unexpected to find that passing the prior art fish oils through the silica gel column can significantly improve their oxidative and flavor stabilities, particularly when a suitable natural antioxidant is added.

Moreover, the silica gel treatment will significantly reduce the amount of the harmful heavy metals which might be present in fish oils. For example, a refined, bleached and deodorized (200° C., 2 hrs.) sardine oil which contained 14 ppb of iron, and 170 ppb of lead was passed through a silica gel column according to the present invention. The iron content of the purified oil was reduced to 3 ppb (a reduction of 79%) and the lead content was reduced to 44 ppb (a reduction of 73%).

Another example is a refined and bleached Menhaden oil (called SPMO as manufactured by Zapata Haynie Corporation of Reedville, Va.), which contained 11.30 ppm of total PCBs and 0.54 ppm of total DDT. After the oil was treated by the process as described in the present invention, only <0.01 ppm of total PCBs and less than <0.01 ppm of total DDT were left in the oil. Therefore, the possible toxicity of these oils were remarkably reduced by the present invention.

DESCRIPTION OF THE DRAWINGS

The advantages and details of the present invention will become apparent from the following description when taken in conjunction with the accompanying drawings, in which.

DETAILED DESCRIPTION OF THE INVENTION

Vacuum Steam Distillation at Low Temperature—Step 1

This process is designed to remove the low boiling and less polar volatile flavor compounds. The vacuum steam distillation step should be carried out under mild conditions in order to avoid the formation of undesired components. Although temperatures in the range of 30°-150° C. may be used, it is preferable to use temperatures in the 60°-100° C. range. The amount of time required will be dependent somewhat on the temperature range chosen, and the design of the apparatus used, but it is generally preferred to carry out this deodorization process for from about 2 to about 5 hours, and preferably about 2 hours.

Figure 1:
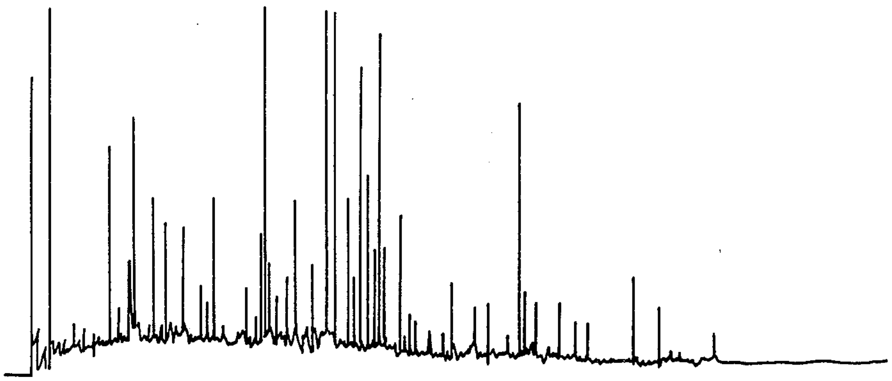
FIG. 1 is a gas chromatogram of volatile flavor compounds isolated from a refined, bleached and partially winterized Menhaden oil, which is not deodorized.
Figure 2:
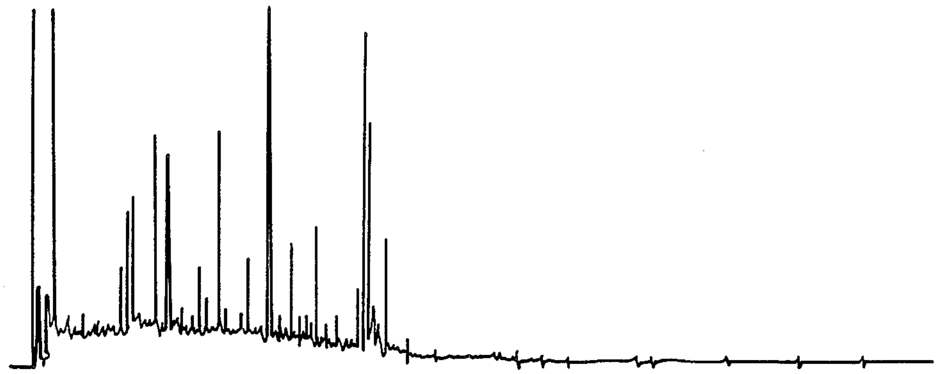
FIG. 2 is a gas chromatogram of volatile flavor compounds isolated from the oil of FIG. 1 after being passed through a silica gel column.
Figure 3:
FIG. 3 is a gas chromatogram of volatile flavor compounds isolated from the oil of FIG. 1 after being vacuum steam distilled at 100° C. for 4 hours.
Figure 4:
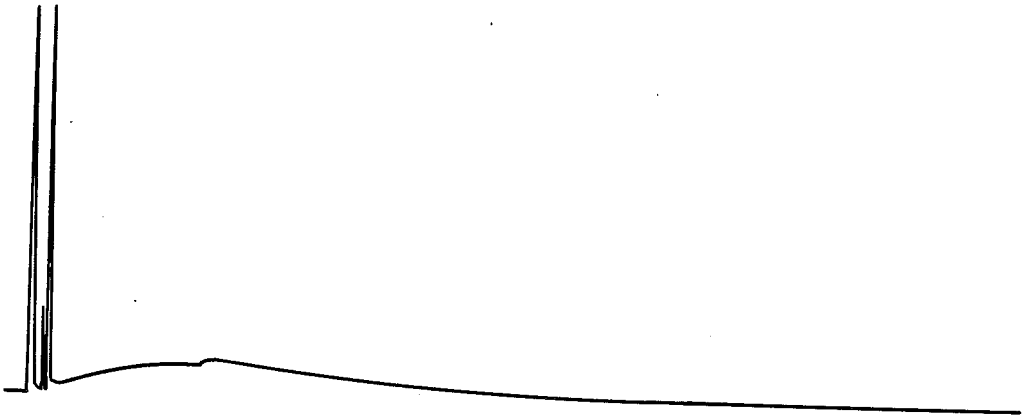
FIG. 4 is a gas chromatogram of volatile flavor compounds isolated from the oil of FIG. 1 after being vacuum steam distilled at 100° C. for 4 hours and then being passed through a silica gel column.
Figure 5:
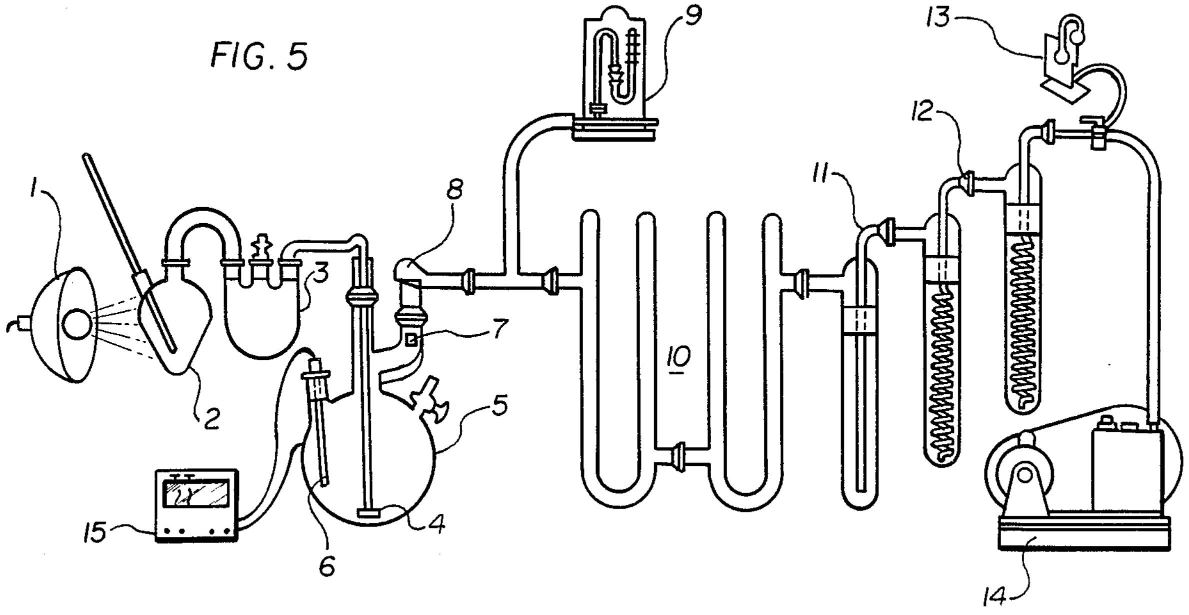
FIG. 5 is a diagram of an apparatus set up and used in the laboratory for the vacuum steam distillation.

The oil may be vacuum steam distilled in an apparatus as shown in FIG. 5. In order to use this apparatus, the oil is placed in Flask 5. Excess water is placed in Reservoir 2, which is heated by radiant Heat Lamp 1, to facilitate steam generation. Safety Flask 3 is installed between Flask 2 and Flask 5. Flask 5 is heated by a temperature controlled, two-piece heating mantle (not shown in FIG. 5). Cold-finger traps 10 are cooled by dry ice, while Cold-coil traps 11 and 12 are cooled by dry ice-acetone slurries. These traps are used to condense the stripping steam and the distillate. Mechanical Pump 14 is used to create a vacuum which could range from about 0.02 to 0.05 mm of mercury in the laboratory, but may be different in the plant.

Silica Gel Treatment—Step 2

The silica gel purification process is designed to remove high boiling and more polar flavor compounds, as well as other undesirable minor constituents. This purification process is carried out by passing the deodorized oils from Step 1 through a column packed with active sorbents, such as silica gel, silicic acid, activated alumina, activated carbon, activated clay and the like. Generally, it is preferable to use silica gel and/or silicic acid, because they are most effective and cause no side reactions. The sorbents are preactivated before use. Preferably, a column is packed with sorbents which are thereafter flushed with an inert gas, such as nitrogen, in order to remove any oxygen entrapped in the column prior to running the oil through the sorbents.

The silica gel purification process may be conducted at room temperature, although higher and lower temperatures may be used Preferably the oil is protected by an atmosphere of inert gas, such as nitrogen, before, during and after the passage of the oil through the column to prevent oxidation. Flow rates ranging from 1 to 3 milliliters per minute per square centimeter are preferred when the particle size of the silica gel is 70 to 230 mesh ASTM. Greater or lesser flow rates may be established, depending upon the dimensions of the column, the particle size of the sorbent and the nature of the sorbent.

Even though the use of a column of silica gel or other sorbents is most effective, a batch process can also be used. The vacuum steam distilled oil may be mixed with 1% to 20%, and preferably 10% to 20%, by weight of activated carbon, stirred vigorously for one hour and then filtered to obtain a purified oil. Silicic acid, silica gel or other adsorbents can be used to replace the activated carbon.

The superior quality of the fish oil deodorized and purified by the present invention is summarized and shown in Table 1.

Variations of Process

The order of the vacuum steam distillation and the purification can be reversed. It is preferred, however, to deodorize first and then pass the deodorized oil through the silicic acid column. This will remove any trace amounts of impurities formed by oxidation during the vacuum steam distillation step.

Enhanced Oxidative and Flavor Stabilities

The oils of the present invention have improved stabilities over prior art oils. Moreover, they may achieve enhanced stabilities by combining the oils with:

1. selected antioxidants;
2. one or more selected vegetable oils; and
3. a combination of selected antioxidants and selected vegetable oils.

As is shown in Table 2, a variety of antioxidants may be used to enhance the stability of the oil produced by the process of the present invention. Of the antioxidants tested, Herbalox TM "O" showed particularly effective results. Herbalox is an extract of Rosemary with antioxidant activity made according to the process described in U.S. Pat. No. 3,950,266, manufactured by Kalsec, Incorporated of Kalamazoo, Mich.

The quantity of antioxidant used may vary over wide ranges, depending upon the type of antioxidant used and the conditions under which the fish oil is to be stored. For example, for a fish oil stored in a loosely capped bottle, 0.10% by weight of Herbalox "O" is an optimum amount to prevent deterioration of the product. However, for fish oil in soft gelatin capsules, only 0.03% of Herbalox "O" is sufficient to provide a stabilized product.

Different antioxidants have different effectiveness toward peroxide formation, gum formation and fishy odor redevelopment. It has been found that about 0.1% by weight of Herbalox "O" generally provides acceptable properties.

It has also been discovered that the fish oil of the present invention may be stabilized by blending the fish oil with certain amounts of vegetable oils. In particular, it has been found that blending the fish oil with as little as 10% by weight of a vegetable oil and preferably 20% by weight of the vegetable oil, produces a composition of enhanced stability, as is shown in Tables 3, and 4. This stability may be enhanced further through the use of antioxidants. Although borage oil, sunflower oil, canola oil and soybean oil have been used, the corn oil has been found to be particularly effective.

EXAMPLES

The following Examples will serve to illustrate the process of the present invention and the improved oils formed thereby, but it is understood that these Examples are set forth merely for illustrative purposes and that many other variations on the process may be used.

EXAMPLE 1

Low Temperature Vacuum Steam Distillation

Present Invention—Step 1

Any apparatus or plant machinery which is suitable for vacuum steam distillation of oil, commonly known as deodorization, can be used. FIG. 5 illustrates apparatus used in the laboratory for this purpose.

The raw material was a specially processed Menhaden oil, supplied under the tradename of SPMO, by Zapata Haynie Corporation. This Menhaden oil has been refined and bleached, but not deodorized, although the oil has been partly winterized. 2,300 grams of SPMO was placed in Flask 5 of the apparatus shown in FIG. 5. Water was placed in Reservoir 2, which was heated by Heat Lamp 1, to generate steam. The cold-finger traps 10 were cooled by dry ice, and cold-coil traps 11 and 12 were cooled by a dry ice-acetone slurry in order to condense the stripping steam and the distillate. The vacuum of the closed system was held in the range of 0.02 to 0.05 mm of mercury. Steam was bubbled through the oil at a rate of 45 to 48 grams per hour. The degree of vacuum and the amount of steam may be varied, depending upon the design and construction of the apparatus, particularly for machinery in the manufacturing plant.

The oil was vacuum steam distilled at a predetermined temperature for a predetermined length of time. After the process was completed, the oil was cooled down to room temperature as rapidly as possible and the vacuum was released to nitrogen. The product of Example 1 is referred to hereinafter as "Low Temperature Deodorized Oils".

Three separate batches of the low temperature vacuum steam distillation, each with 2,300 g. of the specially processed Menhaden oil, were carried out according to the following temperatures and times.

| | |
|---|---|
| Example 1-A, | 60° C. for 2 hours |
| Example 1-B, | 80° C. for 2 hours |
| Example 1-C, | 100° C. for 4 hours |

EXAMPLE 2

Treatment with Adsorbents

Present Invention—Step 2

1,520 grams of silica gel (70–230 mesh ASTM, EM Science, a Division of EM Industries, Inc., Cherry Hill, N.J., which had been activated at 200° C. for 24–36 hours), were packed into a stainless steel column (2 in.×38 in. I.D.×length, custom-made). Nitrogen gas (3–5 psi) was used to flush through the column for 30 minutes. The deodorized oil of Examples 1-A, 1-B and 1-C were each delivered by a positive-displacement pump (Milroyal D4-1-117SM, Milton Roy Company, St. Petersburg, Fla.), into a separate column, with a flow rate of 36–38 grams of oil per minute. The eluate from each of the three columns was collected separately in a vessel covered with nitrogen gas. The process was continued until 2,420 grams of the eluate were collected as 2-A, 2-B and 2-C, respectively. The eluate of Example 2 is referred to hereinafter as "Adsorbent Treated Oils".

EXAMPLE 3

Reverse the Order of Step 1 and Step 2

Present Invention 4,800 g. of the (SPMO) specially processed Menhaden oil was treated with a column of silica gel in the manner described in Example 2, and 2,400 g. were collected. The "Adsorbent Treated Oil" thus obtained was then vacuum steam distilled at 60° C. for 2 hours in the manner as described in Example 1.

EXAMPLE 4

High Temperature Vacuum Steam Distillation

Prior Art Oil 2,300 g. of the specially processed Menhaden oil was vacuum steam distilled in the same manner as described in Example 1, at 200° C. for 2 hours, as Example 4-A. Another batch was carried out at 250° C. for 2 hours to produce a high temperature vacuum distilled oil, as Example 4-B. The products are hereinafter referred to as "Prior Art Oil".

EXAMPLE 5

Adsorbent Treatment of "Prior Art Oil"

Present Invention

The "Prior Art Oils" obtained from Examples 4-A and 4-B were each pumped through a separate new silica gel column in the same manner as described in Example 2, to obtain 2,420 g. of eluate, respectively, as Examples 5-A and 5-B. The oils thus obtained are hereinafter referred to as "Adsorbent Treated Prior Art Oils".

The remarkable and sometimes unexpected improvements of the "Adsorbent Treated Prior Art Oils" are shown in Tables 5, 6 and 7.

EVALUATION OF PRODUCTS OF EXAMPLES

The products of the above examples were evaluated for various parameters to determine the effect of the processes of the present invention on the oil produced thereby. The results of the evaluation also demonstrate the benefits in biological effects and stabilities of the oil produced by the present invention. The following analytical procedures were used:

1. Stability of the Oil

Stability of the products were evaluated by keeping 150 grams of the freshly made oil in a narrow-mouthed amber glass bottle. The surface-to-volume ratio in the beginning was 0.16 $cm^2/ml$. The screw cap was closed tightly and then loosened a half-turn to allow some air circulation. The bottles were placed in an oven maintained at 35°±0.2° C. for four weeks. The following analyses were done periodically.

A. Gum Formation

As a consequence of oxidative polymerization, the oil may form a layer of gummy material on the wall of the bottle. The following symbols were used to describe the amount of gum formed:

| | |
|---|---|
| O | No visible gum; |
| V− | Barely visible; |
| V | Very small amount; |
| VV | Moderate amount; |
| VVV | Large amount. |

B. Peroxide Value

Peroxide values of the samples were measured on the 0, 14th and 28th day of their storage at 35° C., according to the American Oil Chemists' Society's Official Process cd 8-53. In this analysis, the bottle of the oil was usually flushed with nitrogen and then closed tightly with a screw cap. In all the data reported in this patent, however, the screw cap was turned back one-half turn to allow leakage of air into the bottle, in order to simulate ordinary household use. This will give a higher peroxide value after storage when the bottle was tightly closed under nitrogen.

C. Sensory Evaluation

The products, both immediately prepared and after four weeks of storage at 35° C., were sensorially evaluated by a trained panel comprised of 5–7 people. The panelists were asked to rank the test samples in terms of overall impression and perception of fishy odor and flavor. A Hedonic scale of 1–10 was used for the overall odor and flavor in which 10 was assigned to "complete blandness", and 1 to "strong obnoxiousness". The higher score indicates better oil in terms of flavor.

Another Hedonic scale was used to indicate the extent of fishy odor and flavor, in which 0 represents no fishy odor or flavor, while 6 stands for the most strong fishy flavor and odor. The lower the score, the better the oil.

The oils were submitted to the panel at 35° C. The oil was maintained at this temperature by putting the oil in a small beaker which was set into a hole drilled into a large aluminum block. The aluminum block was preheated to 35° C.

2. Cholesterol

The cholesterol was determined by HPLC using an analytical silica column (25 cm. Partisil 5 by Whatman, Inc., Clifton, N.J.).

3. Intermolecular Polymers

Intermolecular polymers of triglycerides were analyzed by gel permeation chromatography, using an Ultrastyragel 500 A Gel Permeation Column, 7.8 mm I.D.×30 cm (Waters Chromatography Division, Millipore Corporation, Milford, Mass.).

The peaks were detected by a Mass Detector (Model 750/14, Applied Chromatography Systems, Peris Industries, State College, Pa.).

In the Tables which follow, the Menhaden oil (SPMO) was refined, bleached and partially winterized, but not deodorized and was the same Menhaden oil used as the starting raw material for Examples 1, 3 and 4 referred to as Menhaden oil.

TABLE 1

SUPERIOR QUALITY OF THE FISH OIL DEODORIZED AND PURIFIED BY THE PRESENT INVENTION

| Analysis | | Menhaden Oil (before deodorization) | Prior Art Oil (deodorized at 200° C.) | Present Invention Oil (Deodorized at 80° C., followed by silica gel treatment) |
|---|---|---|---|---|
| As described in | | — | Example 4-A | Example 2-B |
| I. No Loss of the Effective Components | | | | |
| EPA (%) | | 12.8 | 11.7 | 12.8 |
| DHA (%) | | 8.6 | 7.4 | 8.4 |
| II. Removal and Prevent Formation of Minor Cconstituents Which May Be Harmful to Health | | | | |
| Dimer (%)[1,2] | | 0.7 | 1.0 | <0.1 |
| Trimer (%)[1,2] | | neg. | neg. | neg. |
| Trans Isomers (%) | | 3.4 | 5.0 | 3.5 |
| Cholesterol (%)[3] | | 0.36 | 0.24 | neg. |
| III. Improvement of Oxidative Stability[4,5] | | | | |
| Conjugated Dienes and Trienes $E_{cm}$% | | | | |
| 233 nm | | 7.82 | 15.23 | 8.25 |
| 269 nm | | 2.24 | 14.82 | 2.54 |
| Peroxide Value (meq./kg) After 4 weeks 35° C. | | | 43.9 | 39.8 |
| Gum Formation 35° C. | | | | |
| After 2 weeks | | | V | O |
| After 4 weeks | | | VVV | VV |
| IV. Improvement of Flavor Stability[4,5] | | | | |
| Flavor Score[6] | | | | |
| Fresh | | | | |
| Total | odor | Strong* | 8.6 | 9.2 |
| | taste | " | 7.6 | 8.0 |
| Fishy | odor | " | 0.0 | 0.2 |
| | taste | " | 0.2 | 0.2 |
| 4 weeks, 35° C. | | | | |
| Total | odor | " | 4.2 | 5.8 |
| | flavor | " | 5.2 | 6.0 |
| Fishy | odor | " | 2.2 | 1.4 |
| | flavor | " | 1.6 | 1.0 |

*Too strong to be evaluated
[1]The gel permeation chromatography analysis only measures the dimers and trimers formed between different triglyceride molecules.
[2]Different batches of Menhaden oil may contain different amounts of polymers. The samples received ranged from 0.2 to 0.7%. All the Examples were prepared using Menhaden oil containing 0.7% of polymers.
[3]Calculated according to the peak area corresponding to free cholesterol by HPLC analysis.
[4]All samples contain 0.10% Herbalox "O" as an antioxidant.
[5]Example 2-C oil was used instead of 2-B.
[6]Total flavor uses a score scale of 1-10, the higher the score the better the oil. Fishy flavor uses a score scale of 0-6, the lower the score the less the fishy flavor

TABLE 2

EFFECT OF DIFFERENT ANTIOXIDANTS ON POLYMER FORMATION IN MENHADEN OIL

| Antioxidant Added | Polymer % 0 Weeks | Polymer % 4 Weeks |
|---|---|---|
| Present Invention Oil[1] (Example 2-C) | <0.1 | 0.37 |
| 0.10% Herbalox "O" | <0.1 | 0.19 |
| 0.15% Herbalox "O" | <0.1 | 0.18 |
| 0.20% Herbalox "O" | <0.1 | 0.15 |
| 0.025% P.C.[2] | <0.1 | 0.24 |
| 0.50% P.C. | <0.1 | 0.19 |
| 0.04% dl-alpha-Toc.[3] | <0.1 | 0.29 |
| 0.04% d-delta-rich-Toc. | <0.1 | 0.31 |

[1]No antioxidant added.
[2]Phosphatidylcholine, >95% pure.
[3]Tocopherol, supplied by Eisai, U. S. A., Inc. Torrance, California

TABLE 3

FURTHER IMPROVEMENT OF THE PRESENT INVENTION OIL BY BLENDING WITH DIFFERENT VEGETABLE OILS AS EXPRESSED BY PEROXIDE VALUE INCREASE DURING STORAGE AT 35° C.

| Sample | POV (mEq/kg) Fresh | POV (mEq/kg) 4 Weeks (35° C.) |
|---|---|---|
| Present Invention Oil (Example 2-C) | 1.02 | 39.9 |
| Blending with Corn Oil | | |
| Example 2-C + 20% Corn Oil | 1.29 | 13.5 |
| Example 2-C + 50% Corn Oil | 1.69 | 4.9 |
| Example 2-C + 75% Corn Oil | 2.03 | 4.8 |
| Blending with Other Oils | | |
| Example 2-C + 20% Sunflower Oil | 1.28 | 29.9 |
| Example 2-C + 20% Canola Oil | 1.17 | 28.8 |
| Example 2-A + 20% Soybean Oil | 1.31 | 38.8 |
| Example 2-C + 20% Borage Oil | 1.05 | 20.0 |

Note: All samples contained 0.1% Herbalox TM "O" antioxidant.

TABLE 4

FURTHER IMPROVEMENT OF THE PRESENT INVENTION OIL BY BLENDING WITH VEGETABLE OILS AS EXPRESSED BY GUM FORMATION DURING STORAGE AT 35° C.

| Sample | 2 Weeks | 4 Weeks |
|---|---|---|
| Present Invention Oil (Example 2-C) | O | V |
| Blending with Corn Oil | | |
| Example 2-C + 20% Corn Oil | O | O |
| Example 2-C + 50% Corn Oil | O | O |
| Example 2-C + 75% Corn Oil | O | O |
| Blending with Other Oils | | |
| Example 2-C + 20% Sunflower Oil | O | O |
| Example 2-C + 20% Canola Oil | O | O |
| Example 2-A + 20% Soybean Oil | O | O |
| Example 2-C + 20% Borage Oil | O | O |

All samples contained 0.1% Herbalox TM "O" antioxidant.

TABLE 5

PRIOR ART DEODORIZATION OF FISH OIL AT HIGH TEMPERATURES CAUSES LOSS OF EPA AND DHA AND FORMATION OF GEOMETRICAL OR POSITIONAL ISOMERS WHICH HAVE BEEN REPORTED IN LITERATURE AS HAVING QUESTIONABLE BIOLOGICAL EFFECTS (OIL PRODUCED IN ACCORDANCE WITH THE PRESENT INVENTION DOES NOT CONTAIN SUCH ISOMERS)

| Deodorization Conditions | EPA (%) | Geometrical or Positional Isomers EPA (%) | DHA (%) | Geometrical or Positional Isomers of DHA (%) |
|---|---|---|---|---|
| Menhaden oil | 12.82 | neg. | 8.58 | neg. |
| 150° C., 5 hrs | 12.18 | neg. | 8.27 | neg. |
| 175° C., 3 hrs | 12.38 | neg. | 8.11 | neg. |
| 175° C., 4 hrs | 11.78 | 0.15 | 7.95 | neg. |
| 175° C., 5 hrs | 11.86 | 0.60 | 7.87 | 0.19 |
| 200° C., 1 hr. | 11.45 | 0.37 | 7.66 | 0.16 |
| 200° C., 2 hrs-III | 11.19 | 0.61 | 7.37 | 0.22 |
| 200° C., 4 hrs | 10.51 | 1.12 | 6.71 | 0.71 |
| 250° C., 2 hrs | 2.36 | 2.36 | 1.01 | 3.28 |
| | | Present Invention Oil | | |
| Deodorized at 80° C. for 2 hrs - I | 12.7 | neg. | 8.4 | neg. |
| Deodorized at 100° C. for 4 hrs - II | 12.5 | neg. | 8.3 | neg. |
| I after silica gel purification | 12.8 | neg. | 8.4 | neg. |
| II after silica gel purification | 12.3 | neg. | 8.4 | neg |
| III after silica gel purification | 11.7 | neg. | 7.4 | neg. |

TABLE 6A

PARTIAL ELIMINATION OF THE DAMAGE CAUSED BY HIGH TEMPERATURE DEODORIZATION TO MENHADEN OIL[1] BY PASSING THE DAMAGED OIL THROUGH A SILICA GEL COLUMN

| | Menhaden | Deodorized at 200° C. for 2 hrs | |
|---|---|---|---|
| Item | Oil Before Deodoriza-tion | Before Passing Silica Gel Example 4-A Prior Art Oil | After Passing Silica Gel Example 5-A Present Invention |
| EPA (%) | 12.8 | 11.7[2] | 11.7 |
| DHA (%) | 8.6 | 7.4[2] | 7.4 |
| Dimer (%) | 0.7 | 1.0[3] | 0.2 |
| Trimer (%) | Neg. | Neg. | Neg. |
| Trans Isomers (%) | 3.4 | 5.0 | 4.9 |
| Conjugated Dienes and Trienes ($E_{cm}^{\%}$) | | | |
| 233 nm | 7.82 | 15.23 | 12.10 |
| 269 nm | 2.24 | 14.82 | 12.13 |

[1]Refined, bleached, and partially winterized.
[2]Represents a loss of 8.6% of the original EPA and 14% of the original DHA.
[3]Represents an increase of 42% of the original dimers.

TABLE 6B

PARTIAL ELIMINATION OF THE DAMAGE CAUSED BY HIGH TEMPERATURE DEODORIZATION TO MENHADEN OIL[1] BY PASSING THE DAMAGED OIL THROUGH A SILICA GEL COLUMN

| | Menhaden | Deodorized at 250° C. for 2 hrs | |
|---|---|---|---|
| Item | Oil Before Deodoriza-tion | Before Passing Silica Gel Example 4-B Prior Art Oil | After Passing Silica Gel Example 5-B Present Invention |
| EPA (%) | 12.8 | 2.4[2] | 2.5 |
| DHA (%) | 8.6 | 1.0[2] | 0.9 |

TABLE 6B-continued

PARTIAL ELIMINATION OF THE DAMAGE CAUSED BY HIGH TEMPERATURE DEODORIZATION TO MENHADEN OIL[1] BY PASSING THE DAMAGED OIL THROUGH A SILICA GEL COLUMN

| | Menhaden | Deodorized at 250° C. for 2 hrs | |
|---|---|---|---|
| Item | Oil Before Deodoriza-tion | Before Passing Silica Gel Example 4-B Prior Art Oil | After Passing Silica Gel Example 5-B Present Invention |
| Dimer (%) | 0.7 | 16.9 | 16.5 |
| Trimer (%) | Neg. | 11.5 | 11.8 |
| Trans Isomers (%) | 3.4 | 26.4 | 26.6 |
| Conjugated Dienes and Trienes ($E_{cm}^{\%}$) | | | |
| 233 nm | 7.82 | 53.67 | 47.20 |
| 269 nm | 2.24 | 40.51 | 35.10 |

[1]Refined, bleached, and partially winterized.
[2]Represents a loss of 81% of the original EPA and 88% of the original DHA.

TABLE 6C

PARTIAL ELIMINATION OF THE SELECTED COMPONENTS FORMED DURING LOW TEMPERATURE DEODORIZATION TO MENHADEN OIL[1] BY PASSING THE DEODORIZED OIL THROUGH A SILICA GEL COLUMN

| | Menhaden | Deodorized at 100° C. for 4 hrs | |
|---|---|---|---|
| Item | Oil Before Deodoriza-tion | Before Passing Silica Gel Example 1-C Prior Art Oil | After Passing Silica Gel Example 2-C Present Invention |
| EPA (%) | 12.8 | 12.5 | 12.3 |
| DHA (%) | 8.6 | 8.3 | 8.4 |
| Dimer (%) | 0.7 | 0.7 | <0.1 |
| Trimer (%) | Neg. | neg. | neg. |
| Trans | | | |

TABLE 6C-continued

PARTIAL ELIMINATION OF THE SELECTED COMPONENTS FORMED DURING LOW TEMPERATURE DEODORIZATION TO MENHADEN OIL[1] BY PASSING THE DEODORIZED OIL THROUGH A SILICA GEL COLUMN

| Item | Menhaden Oil Before Deodorization | Deodorized at 100° C. for 4 hrs: Before Passing Silica Gel Example 1-C Prior Art Oil | Deodorized at 100° C. for 4 hrs: After Passing Silica Gel Example 2-C Present Invention |
|---|---|---|---|
| Isomers (%) Conjugated Dienes and Trienes | 3.4 | 3.5 | 3.4 |
| $E_{cm}^{\%}$ | | | |
| 233 nm | 7.82 | 9.03 | 8.73 |
| 269 nm | 2.24 | 3.05 | 2.68 |

[1]Refined, bleached, and partially winterized.

TABLE 7

IMPROVEMENT OF OXIDATIVE AND FLAVOR STABILITIES BY SILICA GEL TREATMENT OF MENHADEN OIL DEODORIZED AT 200° C. FOR 2 HOURS[1] (PRIOR ART OIL, EXAMPLE 4-A)

| Oxidative Stability | Before Treatment | After Treatment Passing The Oil Through a Silica Gel Column Present Invention Example 5-A |
|---|---|---|
| Peroxide Value (meq/kg) | | |
| Fresh | 0.76 | 0.44 |
| 4 Weeks @ 35° C. | 43.9 | 33.7 |
| Gum Formation | | |
| 2 Weeks @ 35° C. | V | O |
| 4 Weeks @ 35° C. | VVV | VV |
| Flavor Stability | | |
| Fresh | | |
| Total Flavor | | |
| Odor | 8.6 | 9.3 |
| Flavor | 7.6 | 9.1 |
| Fishy Flavor | | |
| Odor | 0.0 | 0.0 |
| Flavor | 0.2 | 0.0 |
| 4 Weeks @ 35° C. | | |
| Total Flavor | | |
| Odor | 4.2 | 5.2 |
| Flavor | 5.2 | 5.8 |
| Fishy Flavor | | |
| Odor | 2.2 | 1.2 |
| Flavor | 1.6 | 1.0 |

[1]Menhaden oil, refined, bleached, and partially winterized.

The scope of the invention herein shown and described is to be considered only as illustrative. It will be apparent to those skilled in the art that numerous modifications may be made therein without departure from the spirit of the invention and the scope of the appended claims.

We claim:

1. A process of treating an edible fish oil containing EPA and DHA consisting essentially of:

subjecting said oil to vacuum steam distillation under mild conditions for a time sufficient to reduce low temperature boiling and less polar volatile flavor compounds;

contacting said oil with an adsorbent selected from the group consisting of silica gel and silicic acid to reduce high temperature boiling and more polar volatile flavor compounds and undesirable minor constituents selected from the group consisting of polymers, cholesterol, pigments, pesticides, PCB'S, heavy metals and mixtures thereof, and recovering the treated oil.

2. A process as described in claim 1, wherein said vacuum steam distillation precedes said adsorption.

3. A process as described in claims 1 or 2, wherein said vacuum steam distillation is carried out at temperatures in the range of 60°-100° C. and at a vacuum no greater than about 12 mm of mercury.

4. A process as described in claims 1 or 2, wherein the said vacuum steam distillation is carried out at temperatures in the 60°-100° C. range.

5. A process for treating fish oil containing EPA and DHA consisting essentially of:

subjecting said fish oil to vacuum steam distillation at a temperature between 30° C. and 150° C. for 2-5 hours;

contacting said oil with an adsorbent selected from the group consisting of silica gel and silicic acid to reduce high temperature boiling and more polar volatile flavor compounds and undesirable minor constituents selected from the group consisting of polymers, cholestrol, pigments, pesticides, PCB's heavy metals and mixtures thereof; and recovering the treated oil.

6. A process as described in claim 5, wherein said vacuum steam distillation precedes said adsorption.

7. A process for treating fish oil as described in claim 5, wherein said steam distillation is carried out at temperatures between 60° C. and 100° C.

8. A process of treating fish oil as described in claim 5, wherein said vacuum steam distillation is carried out at a pressure no greater than about 12 mm of mercury.

9. A process for treating fish oil as described in claim 5, wherein said adsorbent is silica gel.

10. A process of treating an edible fish oil containing EPA and DHA consisting essentially of:

subjecting said oil to deodorization by vacuum steam distillation at temperatures in excess of 150° C. for a time sufficient to reduce volatile flavor compounds;

contacting said deodorize oil with an adsorbent selected from the group consisting of silica gel and silicic acid to reduce volatile flavor compounds and undesirable minor constituents selected from the group consisting of polymers, cholesterol, pigments, pesticides, PCB's, heavy metals and mixtures thereof; and recovering the treated oil.

11. A process as described in claim 10, wherein said adsorbent is silica gel.

* * * * *